Aug. 22, 1961     E. B. RITCHEY     2,997,023
MAGNETIC NOSE RING
Filed July 24, 1959

INVENTOR.
Eugene B. Ritchey
BY WHITEHEAD, VOGL & LOWE
PER *Frank C. Lowe*
ATTORNEYS United States Patent Office 2,997,023
Patented Aug. 22, 1961

2,997,023
MAGNETIC NOSE RING
Eugene B. Ritchey, Rte. 2, Box 43, Fort Lupton, Colo.
Filed July 24, 1959, Ser. No. 829,335
3 Claims. (Cl. 119—132)

This invention relates to protective devices for livestock, and more particularly to magnetic intercepting devices which are to prevent livestock and especially cattle from swallowing small iron objects such as nails and bits of wire that find their way into livestock feed. A primary object of the invention is to provide a novel and improved magnetic interceptor which is worn on the muzzle of an animal and functions to prevent the animal from accidentally picking up and swallowing iron objects sometimes found in livestock feed.

The present invention, a nose ring adapted to carry a magnet at the muzzle of an animal, is a development from and an improvement over my prior invention, a Device for Preventing the Introduction of Ferric Substances Into the Digestive Tract of an Animal, which issued as U.S. Patent No. 2,725,037 on November 29, 1955.

In the feeding of livestock and especially dairy cattle, there is always the danger that the cattle will pick up and swallow nails and bits of wire and similar small iron objects which happen to be in the food. Once swallowed these objects will enter the animal's intestinal tract. Possibly some of these objects will pass through the animal, but usually they will remain to ultimately penetrate the lining of the intestines and cause discomfort and even serious illness. This is a major problem in the care of dairy cattle, for no matter how careful the feeders are, such objects will accidentally be found in the feed and there is always a need and demand for devices which will prevent cattle from swallowing such iron objects.

The concept of placing a magnet at the muzzle of an animal was first set forth in my previous Patent Number 2,725,037, wherein a magnet was swingably suspended from a ring carried in the nose of the animal, but this structure was not entirely satisfactory, both from a structural and operational viewpoint. The necessary magnetic structure does not form an efficient unit and the constant swinging action of the magnet on the ring wears the unit out in a short period of time and also tends to irritate the animal and the animal tends to swing the magnet out of the way while feeding. Also, the swinging action of the magnet on the ring will not let the animal associate a pull of the magnet with the presence of an iron object in the feed.

Actually, any small permanent magnet which can be used at the muzzle of an animal will not have enough force to pick out an iron object embedded in a wad of hay or silage which the animal is taking into its mouth. However, it was discovered through a period of using and testing such magnetic intercepters on cattle that they actually work. The animal will often sense the presence of an iron object in its feed and a cow will spit the food out of its mouth and break up the wad to remove the iron object which is picked up on the magnet. Also, a cow will push and sort out the feed with her nose before eating it and thereby pick up iron objects in the feed. In other words, the primary and logical objection to the use of a magnet small enough to be worn by the animal is that it would not have sufficient strength. This objection was found to be groundless because the animals, through natural feeding habits or through some degree of intelligence will learn how to effectively use the magnets for removing iron objects from their feed.

The present invention was conceived and developed as the above considerations were recognized, and the further objects of the invention are to provide a novel and improved magnetic interceptor to be worn on the muzzle of an animal which: (a) is adapted to lie on the animal's muzzle with the poles of the magnet adjacent to the upper lip of the animal; (b) remains in place substantially against the lip of the animal to effectively contact iron objects whenever the animal is nosing and pushing feed with its muzzle; (c) is in the form of a simple nose ring; (d) is especially adapted to incorporate small, high strength magnets in its structure; (e) is rigidly and solidly formed, yet may be easily opened by a simple auxiliary spreader tool for connection to the nose of an animal, yet cannot come apart, rotate out of position or otherwise become disengaged through ordinary use; (f) is a low-cost, neat-appearing simply-constructed, rugged and durable unit.

With the foregoing and other objects in view, all of which more fully hereinafter appear, my invention comprises certain novel and improved constructions, combinations and arrangements of parts and elements as hereinafter described, defined in the appended claims and illustrated in preferred embodiment in the accompanying drawing in which:

Figure 1:
FIGURE 1 illustrates a cow wearing the improved magnetic intercepter, hereinafter referred to as a magnetic nose ring.

Referring more particularly to the drawing, the magnetic interceptor is formed generally as a nose ring 10 to fit into the nostrils of an animal in the same manner as does a conventional ring. However, the improved magnetic nose ring 10 is preferably formed in a somewhat elliptical shape which includes a ring sector 11 and a horseshoe-type magnet 12 suitably held between the separated ends of the ring section 11. The elliptical form of the ring is preferred to better fit in the cow's nose and at the same time lie against the cow's muzzle with the magnet at her lip as illustrated at FIG. 1. As in conventional practice the ring is fitted into the nostrils of the animal and it extends through a suitable pierced hole in the membrane wall between the nostrils of the animal.

Figure 4:
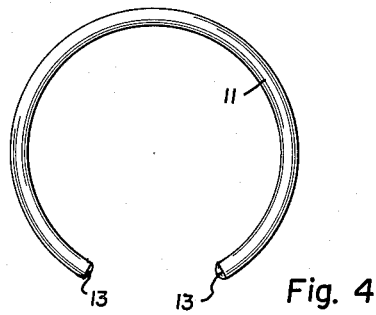
FIGURE 4 illustrates the ring portion of the unit.
Figure 3:
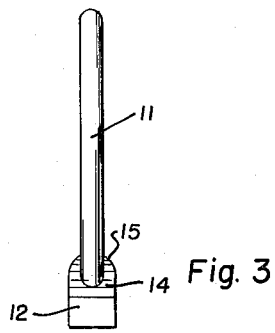
FIGURE 3 is an edge view of the magnetic nose ring as taken from the indicated arrow 3 at FIG. 2.
Figure 5:
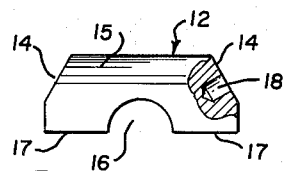
FIGURE 5 illustrates the magnet portion of the unit with a section broken away to show constructions otherwise hidden from view.

The ring 11 is preferably formed of a non-magnetic, non-corrosive metallic material having sufficient stiffness and resiliency to securely grip the magnet 12 between the ends of the ring. A heavy gage stainless steel wire is an ideal material from which to form this ring since it is strong, non-magnetic and non-corrosive. While this magnetic nose ring has been described as being elliptical in form, the ring itself may be more nearly circular as illustrated at FIG. 4 and may be spread to the ellipse form which holds the magnet as illustrated at FIG. 3. The wire forming the ring is thus shaped as a major sector of a circle extending through an arc substantially greater than 180 degrees, a half circle, and preferably to an arc of approximately 300 degrees. So formed the ends 13 are suitably spaced apart and are inclined with respect to each other as illustrated at FIG. 4. The space between the ends 13 is less than the space between the ends of the magnet so that the ring will have to be resiliently spread when holding the magnet, as hereinafter set forth in detail.

The magnet 12 is preferably formed of a high magnetic-strength alloy and several types of alloys are now available which make very strong, permanent magnets. It is formed as a short bar having each end cut on a slope as at 14, a rounded top edge 15 and a flat bottom edge with a central notch 16 forming separated bottom surfaces 17. The sloped ends, top edge and notched bottom edge form a curved path of magnetic influence within the bar to constitute a horseshoe-type magnet, with the bottom surfaces 17 at each side of the notch forming the pole ends of the magnet where maximum flux density occurs in a pattern suggestive of that found in a conventional horseshoe magnet, as suggested by broken lines M at FIG. 2. Since the bottom surfaces 17 are arranged to lie at the edge of the animal's lip, the region of most intense magnetic influence will be immediately below the lip and at the animal's mouth.

Each end 13 of the ring 11 is inserted into a suitable socket 18 in each sloped end 14 of the magnet 12, the sockets 18 being drilled into the sloped ends 14 at opposing angles with respect to the axis of the magnet which correspond with the respective angles or inclinations of the end portions of the ring 11. For fitting the ends of the ring into the sockets 18, the ring must be forcibly spread and when so connected it cannot be disconnected from the magnet by any ordinary use or by ordinary force. Moreover, because of the angled fit of the ring ends 13 into the sockets 18 and the magnet cannot rotate about the ring or otherwise shift its position.

Figure 2:
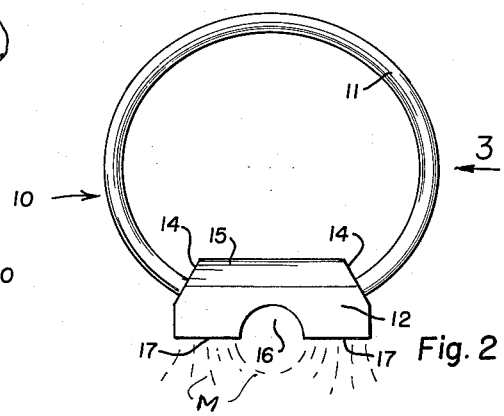
FIGURE 2 is a plan view of the magnetic nose ring per se on an enlarged scale over the showing at FIG. 1.

An elliptical form of the ring is preferred to better correspond with the contour of an animal's nose and lip and the ring shape may be formed somewhat in the manner illustrated at FIG. 2. However, it may be formed to any other suitable shape as desired. The object of so shaping the ring is to permit it to lie flatly and snugly against the animal's lip with a minimum tendency of the ring to swing and move the magnet away from the animal's lip as it is feeding.

Figure 6:
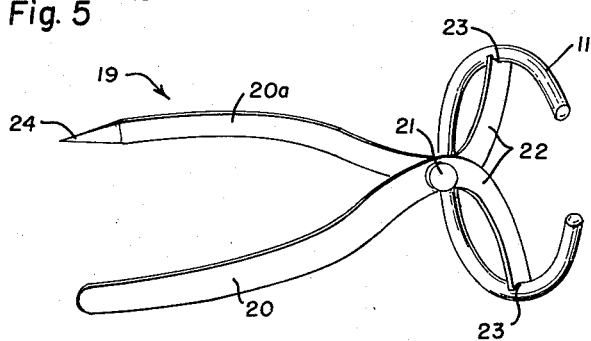
FIGURE 6 is a perspective view of the ring portion as held by an improved spreader device which is especially adapted to be used for spreading the ring portion for interconnecting it with the magnet.

A spreader plier 19, such as illustrated at FIG. 6, is necessary to effectively spread the ring for connecting and disconnecting it to the magnet, as when the unit is mounted upon the muzzle of a cow by threading the ring through the animal's nose. This plier may be formed as a pair of handles 20 and 20a interconnected by a pivot 21 with the handles turned to form outwardly diverging spreader tongs 22 having cupped ends 23 to grip against the opposing inner surfaces of the ring, as clearly illustrated at FIG. 6. The plier handle 20a may also include a suitable piercing point 24 for piercing and forming a hole in the membrane wall between the cow's nostrils which is required to mount the nose ring in place.

Once the magnetic nose ring is mounted on the muzzle of a cow with the magnet at its upper lip, the animal appears to learn to sense an iron object in its feed and spit it out of its mouth. Also a cow will break up wads of hay or silage by pushing her nose against the feed and thereby permitting the magnet to gather nails and iron wire which are in the feed and to retain the same until they can be cleaned off of the magnet by an attendant.

While I have now described my invention in considerable detail, it is obvious that others skilled in the art can build and devise alternate and equivalent constructions which are within the spirit and scope of my invention. Hence, I desire that my protection be limited, not by the constructions illustrated and described, but only by the proper scope of the appended claims.

I claim:

1. A magnetic nose ring adapted to be worn on the muzzle of an animal with the ring being mounted in and through the nostril thereof, and comprising, a stiff resilient ring formed substantially as a major sector of a circle with spaced-apart opposing end portions which are inclined with respect to each other and a horseshoe-type magnet carried between the end portions of the ring, said magnet including a socket at each side thereof which is inclined to correspond with the inclination of the ring-end-portions and is adapted to snugly receive said end portions with the ring tightly gripping the magnet between its ends to hold the poles of the magnet in a fixed position outwardly from the ring.

2. The organization defined in claim 1 wherein the normal spacing between the end portions of the ring is substantially less than the spacing between the sockets at each side of the magnet whereby the ring end portions must be spread apart when in the sockets to thereby resiliently grip the sockets.

3. A magnetic nose ring adapted to be worn on the muzzle of an animal with the ring being mounted in and through the nostril thereof, and comprising, a stiff resilient ring formed substantially as a major sector of a circle with spaced-apart opposing end portions which are inclined with respect to each other and a horseshoe-type magnet carried between the end portions of the ring, said magnet including a socket at each side thereof which includes an edge portion formed to correspond with the shape of the ring-end-portions, and is adapted to receive said end portions with the ring gripping the magnet between its ends and with the ring-end-portions being against said socket-edge-portions to hold the poles of the magnet in a fixed position outwardly from the ring.

References Cited in the file of this patent

UNITED STATES PATENTS

| | | |
|---|---|---|
| 1,276,122 | Scheid | Aug. 20, 1918 |
| 2,725,037 | Ritchey | Nov. 29, 1955 |